United States Patent
Sanampudi et al.

(10) Patent No.: US 12,141,050 B2
(45) Date of Patent: Nov. 12, 2024

(54) LIGHTWEIGHT SOFTWARE PROBE AND INJECT GADGETS FOR SYSTEM SOFTWARE VALIDATION

(71) Applicant: Ciena Corporation, Hanover, MD (US)

(72) Inventors: Padma Sanampudi, San Jose, CA (US); David Henry Gilson, Honolulu, HI (US); Bruce Todd Jorgens, Eagle, ID (US)

(73) Assignee: Ciena Corporation, Hanover, MD (US)

( * ) Notice: Subject to any disclaimer, the term of this patent is extended or adjusted under 35 U.S.C. 154(b) by 345 days.

(21) Appl. No.: 17/412,367

(22) Filed: Aug. 26, 2021

(65) Prior Publication Data
US 2023/0066012 A1    Mar. 2, 2023

(51) Int. Cl.
*G06F 11/00*   (2006.01)
*G06F 9/54*   (2006.01)
*G06F 11/36*   (2006.01)
*H04L 67/133*   (2022.01)

(52) U.S. Cl.
CPC ............ *G06F 11/366* (2013.01); *G06F 9/547* (2013.01); *H04L 67/133* (2022.05)

(58) Field of Classification Search
CPC ....... G06F 11/366; G06F 9/547; H04L 67/133
See application file for complete search history.

(56) References Cited

U.S. PATENT DOCUMENTS

| | | | |
|---|---|---|---|
| 5,838,315 A * | 11/1998 | Craycroft | G06F 9/451 715/781 |
| 8,045,553 B2 | 10/2011 | Jorgens et al. | |
| 8,199,750 B1 | 6/2012 | Schultz et al. | |
| 8,355,317 B1 | 1/2013 | Hu et al. | |
| 8,830,845 B2 | 9/2014 | Jorgens et al. | |
| 8,929,254 B2 | 1/2015 | Hu et al. | |
| 9,203,746 B2 | 12/2015 | Gilson et al. | |
| 9,544,323 B2 * | 1/2017 | Porcello | H04L 63/0272 |
| 10,108,677 B2 | 10/2018 | Gilson | |
| 10,425,153 B2 | 9/2019 | Holness et al. | |
| 10,608,954 B2 | 3/2020 | Gosselin-Harris et al. | |
| 11,144,398 B2 * | 10/2021 | Wilding | G06F 11/3688 |
| 12,086,054 B1 * | 9/2024 | Cela Diaz | G06F 11/3684 |
| 2008/0010523 A1 * | 1/2008 | Mukherjee | H04L 43/50 714/25 |
| 2009/0172205 A1 * | 7/2009 | Chiu | G06F 11/328 710/8 |
| 2009/0235282 A1 * | 9/2009 | Meijer | G06F 9/547 719/320 |

(Continued)

*Primary Examiner* — Loan L. T. Truong
(74) *Attorney, Agent, or Firm* — Baratta Law PLLC; Lawrence A. Baratta, Jr.

(57) ABSTRACT

Systems and methods include, responsive to a request to test or troubleshoot a software system including a plurality of sub-components that communicate with one another via Application Programming Interfaces (APIs), creating one or more gadgets that one or more of inject data in any sub-component and probes responses from any sub-component; performing one or more tests of one of more of the plurality of sub-components utilizing the one or more gadgets to invoke specific behavior of the software system and to collect internal data to examine correctness of the behavior; and subsequent to the one or more tests, removing the one or more gadgets. The one or more gadgets are non-intrusive and do not alter behavior of the plurality of sub-components.

18 Claims, 4 Drawing Sheets

(56) References Cited

U.S. PATENT DOCUMENTS

| | | | |
|---|---|---|---|
| 2010/0138316 A1* | 6/2010 | Connors | G06F 9/451 |
| | | | 715/752 |
| 2010/0218058 A1* | 8/2010 | Somasundaram | |
| | | | G01R 31/31706 |
| | | | 714/724 |
| 2012/0151268 A1* | 6/2012 | Dearing | G06F 11/3624 |
| | | | 714/38.1 |
| 2013/0036404 A1* | 2/2013 | Shu | G06F 11/3676 |
| | | | 717/127 |
| 2015/0212714 A1* | 7/2015 | Hua | G05B 19/409 |
| | | | 715/739 |
| 2017/0242784 A1* | 8/2017 | Heorhiadi | G06F 11/3684 |
| 2019/0158361 A1* | 5/2019 | Blasi | H04L 43/065 |
| 2019/0171948 A1* | 6/2019 | Pillai | G06F 11/3006 |

\* cited by examiner

LIGHTWEIGHT SOFTWARE PROBE AND INJECT GADGETS FOR SYSTEM SOFTWARE VALIDATION

FIELD OF THE DISCLOSURE

The present disclosure generally relates to software systems. More particularly, the present disclosure relates to systems and methods for a lightweight software probe and inject gadgets for system software validation.

BACKGROUND OF THE DISCLOSURE

Software validation is done in a black box testing methodology focused on external behavior of a feature and a unit test methodology focused on a very specific aspect through mock input data without ability to observe internal behavior. Another popular mechanism is a white box testing methodology focused on covering every single internal micro-code path. It is extremely challenging to validate internal component behavior with the black box testing methodology. The unit testing methodology lacks the means to drive multi-unit complex system functional behavior. The white box testing methodology requires extensive software testing effort to cover multi-unit complex system functional behavior and lacks the flexibility to tune to cover specific set of internal behavior. All of these methodologies rely on formatted content for validation of interfaces (Application Programming Interface, APIs) which makes them brittle and higher level of on-going effort to maintain and update to suit variety of test scenarios.

BRIEF SUMMARY OF THE DISCLOSURE

The present disclosure relates to systems and methods for a lightweight software probe and inject gadgets for system software validation. The systems and methods include creation and deployment of one or more non-intrusive (without altering software internals or behavior) lightweight objects which would be used to validate system software APIs based on content definitions and without relying on formatted data to validate system behavior. The lightweight objects are described herein as gadgets that is non-intrusive and non-altering to the running system the gadget is deployed on. Additionally, the gadget would consume minimal system resources, especially Central Processing Unit (CPU) cycles. Gadgets either inject events to trigger sub-component behavior or probe to collect transient data exchanged between various sub-components.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. The steps include, responsive to a request to test or troubleshoot a software system including a plurality of sub-components that communicate with one another via Application Programming Interfaces (APIs), creating one or more gadgets that one or more of inject data in any sub-component and probes responses from any sub-component; performing one or more tests of one of more of the plurality of sub-components utilizing the one or more gadgets to invoke specific behavior of the software system and to collect internal data to examine correctness of the behavior; and, subsequent to the one or more tests, removing the one or more gadgets.

The one or more gadgets can be non-intrusive and do not alter behavior of the plurality of sub-components. The request can be to troubleshoot, and the steps can further include utilizing the one or more gadgets to recreate a problem that is being troubleshot. The request can be to test, and the steps can further include utilizing the one or more gadgets to emulate one or more sub-components that are not complete. The one or more gadgets can be configured to inject the data via defined structured data and to observe behavior based on the injected data. The one or more gadgets can be contained in a container included with the software system, and wherein the one or more gadgets are interfaced locally or remotely using a Remote Procedure Call (RPC).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a lightweight software probe and inject gadgets for system software validation. The systems and methods include creation and deployment of one or more non-intrusive (without altering software internals or behavior) lightweight objects which would be used to validate system software APIs based on content definitions and without relying on formatted data to validate system behavior. The lightweight objects are described herein as gadgets that is non-intrusive and non-altering to the running system the gadget is deployed on. Additionally, the gadget would consume minimal system resources, especially Central Processing Unit (CPU) cycles. Gadgets either inject events to trigger sub-component behavior or probe to collect transient data exchanged between various sub-components or collect persistent data stored in various sub-components.

Figure 1:
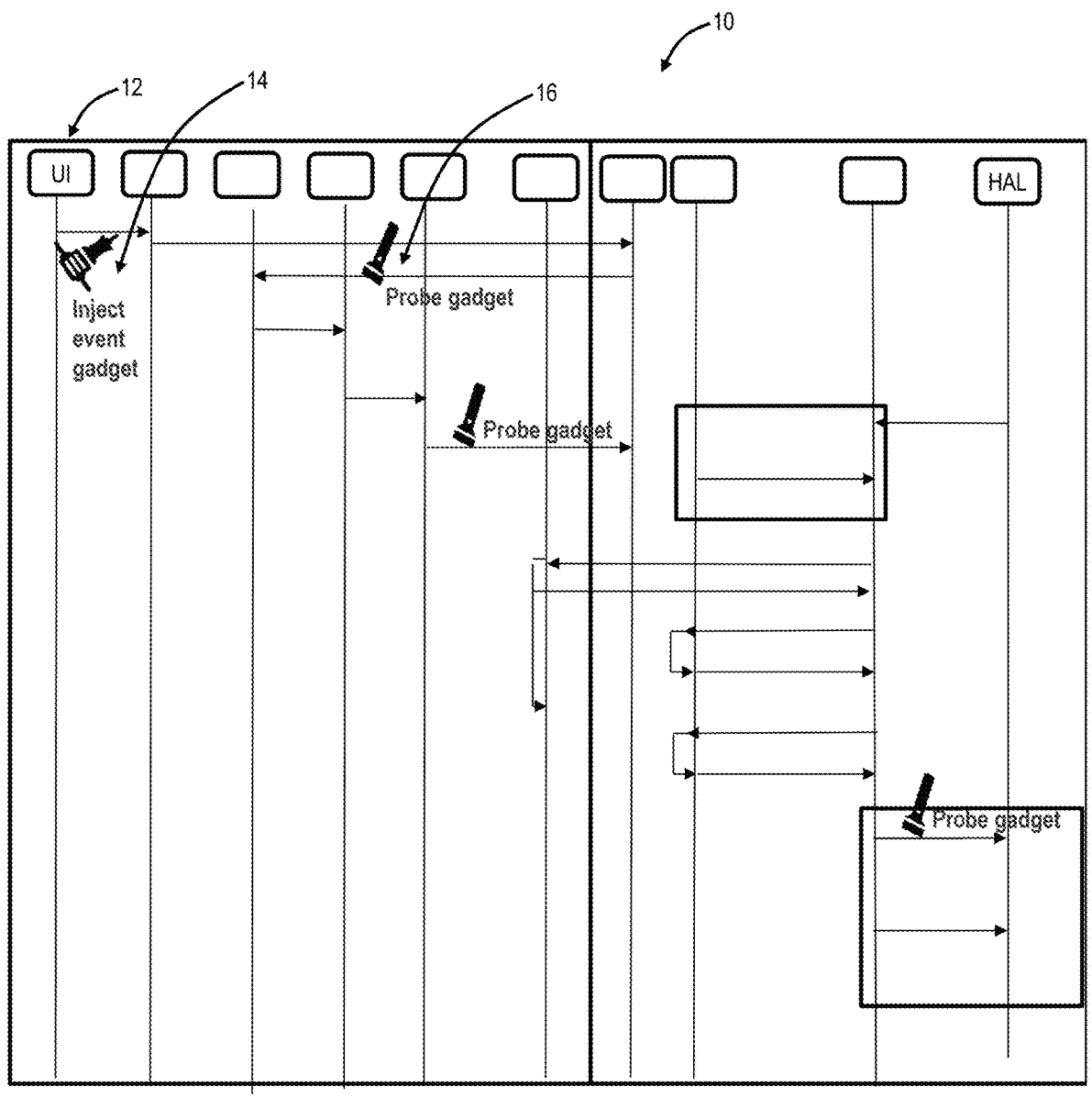
FIG. 1 is a flow diagram of an example system having a plurality of software components.

FIG. 1 is a flow diagram of an example system 10 having a plurality of software sub-components 12. In an embodiment, the system 10 can be a network element, such as the network element 100 illustrated in FIG. 2. The present disclosure contemplates other types of systems running distributed software components 12. Also, in an embodiment, the software sub-components 12 can be microservices, services, and the like with APIs.

The present disclosure relates to testing of the example system 10. In conventional approaches, software testing and observation points are embedded in the software in the example system 10. The present disclosure avoids this approach by dynamically creating the gadgets 14, 16 as needed in a transient manner, i.e., the gadgets are removed once testing is complete For the network element, the system 10 includes a User Interface (UI) sub-component, a plurality of intermediate sub-components 12, and a Hardware Abstraction Layer (HAL) sub-component. In FIG. 1, for illustration purposes, there is an inject event gadget 14 and multiple probe gadgets for observation.

Deploying the gadgets 14, 16 allows the exercising of various scenarios to validate behavior of one or more sub-components 12. regardless of whether the sub-component is local or remote. The gadgets 14, 16 can be used emulate complex customer scenario in a simple setup. The gadgets 14, 16 can be deployed in a non-intrusive way to showcase robustness of the system 10 software. The gadgets 14, 16 allow the same test cases to be exercised in a standalone system or distributed system or simulator.

The gadgets 14, 16 allow the test scenario to be transparently executed 'on-box' from an optional container on one of the nodes under test, 'off-box' from an external system or in an on-box/off-box hybrid as is required when testing DDC (Distributed Disaggregated Chassis) products. The gadgets 14, 16 are implemented or 'installed' on a network element, such as within a container. The gadgets 14, 16 executed against the same network element they are 'installed' in are said to be being exercised con-box'. The gadgets 14, 16 executed against a network element other than the network element they are installed in are said to be being exercised 'off-box'. Off-box gadget invocations make use of an RPC mechanism. On-box gadget invocations can call a local method. The gadgets 14, 16 can be part of an Automatic Unit Test (AUT) container that is distributed with system software of the system 10. Alternatively, the AUT can be a microservice in the system software. Of note, the gadgets 14, 16 are connected to a message bus (or have access thereto) for obtaining data and injecting data.

A lightweight gadget refers to the execution behavior of gadgets 14, 16 being non-intrusive and non-altering to the running system the gadget is deployed on. Additionally, the gadgets 14, 16 would consume minimal system resources, especially CPU cycles.

"Content definitions" here refers to software defined structured data, whereas "formatted data" here refers to a translated interpreted view of the data (such as logs) with no guarantee that the formatted data is complete relative to the software defined structured data.

The gadgets 14, 16 either inject events to trigger sub-component behavior or probe to collect transient data exchanged between various sub-components. The gadgets 14, 16 are used to identify the location of a problem with certainty for the sub-component 12 based on well-defined structures, messages, and transient data exchanged between system sub-components.

The gadgets 14, 16 can be implemented via software development in a modern interpreted language. The usage of the gadgets 14, 16 occurs via invocation of a gadget library by specific test scenarios written to validate the software functionality and behavior. Test scenarios deploy the gadgets 14, 16 with specific content to invoke specific behavior of the system 10 and also use the gadgets 14, 16 to collect internal data to examine the correctness of the behavior.

The gadget library can be deployed inside of an optional container with a node under test and can be exercised locally or remotely using an RPC (remote procedure call) facility. Test scenarios that interact with gadgets on the same container are being exercised locally (on-box). Test scenarios that interact with gadgets located on a remote container are being exercised remotely (off-box). Some test scenarios, such as those operating on DDC (Distributed Disaggregated Chassis) products will exercise gadgets both locally and remotely.

Once the tests are complete, the gadgets 14, 16 can be removed. Thus, the system 10 is deployed in a network or the like without the gadgets 14, 16 operating, providing additional security. Also, the gadgets 14, 16 can be deployed in a field system for troubleshooting, as well as in testing during development.

The gadgets 14, 16 provide flexibility to iterate validation with a varying degree of scope such as at a component or sub-component or multi-component behavior. For example, the gadgets 14, 16 can be used to emulate sub-components 12 that are not yet developed, such as to test other sub-components 12.

The gadgets 14, 16 provide an ability to exercise robustness of the system 10 handling of unexpected data and sequences.

The gadgets 14, 16 provide an ability to recreate customer reported problems in a granular way without needing complex setup mimicking customer deployment scenario. The gadgets 14, 16 can be deployed on customer devices (either in production or lab) in a non-intrusive way for troubleshooting.

The gadgets 14, 16 can be deployed in a standalone box, simulator and distributed system.

The gadgets 14, 16 provide an ability to determine how the system 10 handles negative scenarios which are hard to invoke with current methodologies that are limited to usage of external functionality.

The advantages of the gadgets 14, 16 include incremental functional validation built into development cycle, significant reduction of test scenarios by EIT (Engineering Integration Test), QA (Quality Assurance), PV (Product Verification) teams, the ability to cover unexpected sequences, increased knowledge and debuggability across dev and test resulting in delivering robust product to customers, cost savings (reduced CAPEX) by not using physical devices, quick turn-around to provide customer fix/patch releases resulting in improving customer satisfaction and cost savings, and the like.

The gadgets 14, 16 are designed knowing the architecture of the system 10. However, the gadgets 14, 16 are not embedded in the software of the system 10. Again, the gadgets 14, 16 are implemented on-demand, as-needed, in a transient manner. The gadgets 14, 16 are configured to monitor and implement the behavior of any part of the system 20.

In an embodiment, the gadgets 14, 16 are deployed to a network device dynamically as part of an execution scenario to invoke internal system behavior for an external network event without relying on external stimuli and they are not embedded within a given production software image of a network device. These gadgets 14, 16 provide mechanism to invoke internal behavior of a distributed network system represented by a collection of physical network devices. In particular, there is no need for including these gadgets along with production software. This is significantly different approach from conventional solutions where such code coexists with product software, The gadgets 14, 16 can be deployed from an external entity (e.g., Virtual Machine (VM), development machine, operator laptop) to trigger system internal behavior and collect the internal response to such stimuli to evaluate the correctness of system behavior. Triggering of system internal behavior involves interaction of multiple sub-components of the system (many of them are not exposed as micro services/external APIs) and collection of various data (transient, volatile, and persistent data) for further evaluation by an external entity.

The gadgets 14, 16 provide the ability to drive system internal behaviors through invocation of external network events as stimuli without relying on actual creation of the network event. These gadgets 14, 16 provide flexibility of scope to suit required granular invocation to drive specific internal behavior and to capture system response to such stimuli. Moreover, existing test methodologies do not offer the ability to drive specific required behavior in a production environment (e.g., customer deployment) therefore, offering a clear distinction compared to current test methodologies.

Also, the gadgets 14, 16 are not only focusing on API testing, but also behavioral testing.

Node

Figure 2:
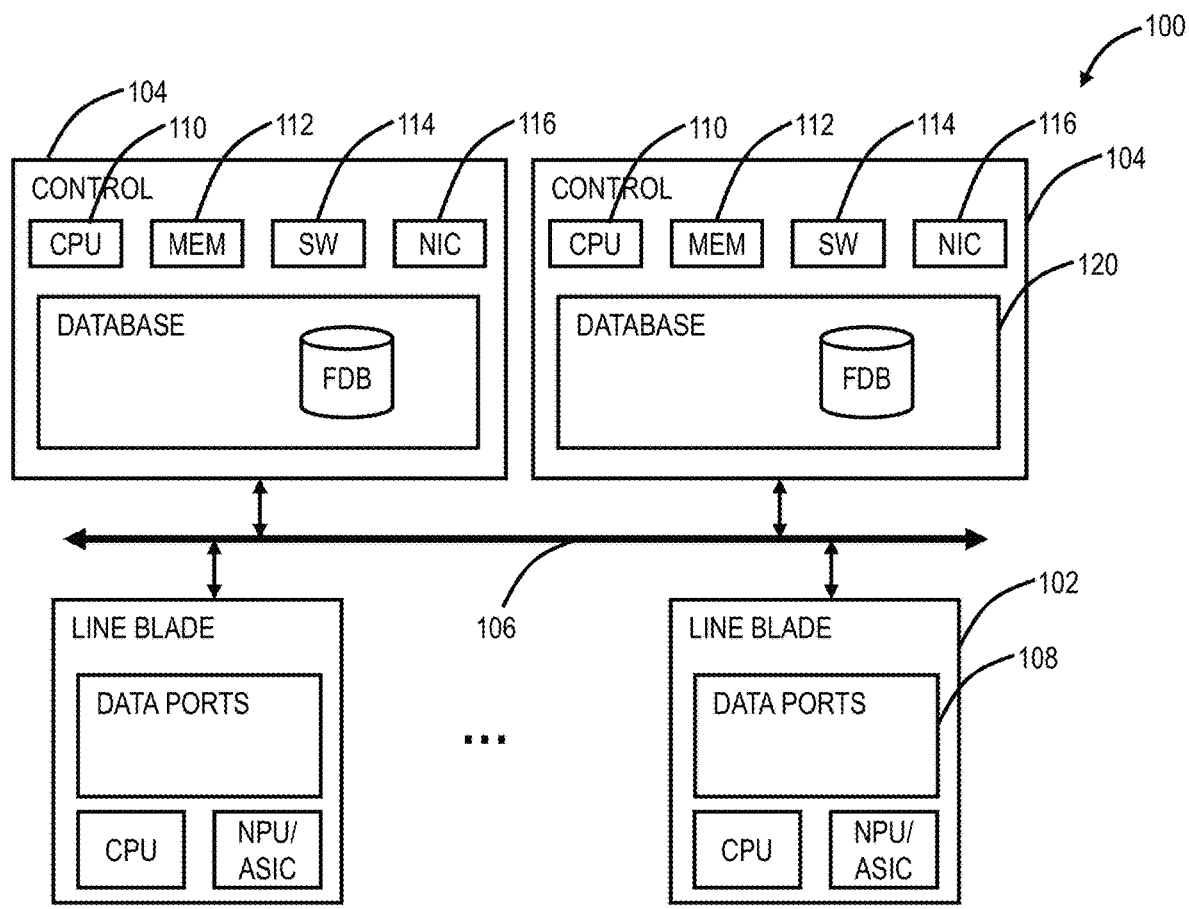
FIG. 2 is a block diagram of an implementation of a network element, as an example of the example system of FIG. 1.

FIG. 2 is a block diagram of an implementation of a network element 100, as an example for the example system 10. In this embodiment, the network element 100 is a packet switch, but those of ordinary skill in the art will recognize the systems and methods described herein can operate with other types of network elements and other implementations. In this embodiment, the network element 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the network element 100. Each of the blades 102, 104 can include numerous electronic devices and/or optical devices mounted on a circuit board along with various interconnects including interfaces to the chassis, shelf, etc. Also, FIG. 2 is a logical view and those skilled in the art will recognize other implementations are contemplated. That is, the network element 100 includes ports and a switching fabric between the ports, along with control circuitry.

Two example blades are illustrated with line blades 102 and control blades 104. The line blades 102 include data ports 108, such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108, allowing data traffic to be switched between the data ports 108 on the various line blades 102. The switching fabric is a combination of hardware, software, firmware, etc. that moves data coming into the network element 100 out by the correct port 108 to the next network element 100. "Switching fabric" includes switching units in a node; integrated circuits contained in the switching units; and programming that allows switching paths to be controlled. Note, the switching fabric can be distributed on the blades 102, 104, in a separate blade (not shown), integrated on the line blade 102, or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the network element 100. The network interface 116 may be utilized to communicate with an element manager, a network management system, etc. Additionally, the control blades 104 can include a database 120 that tracks and maintains provisioning, configuration, operational data, and the like. In this embodiment, the network element 100 includes two control blades 104, which may operate in a redundant or protected configuration such as 1:1, 1+1, etc.

Example Processing Device Architecture

Figure 3:
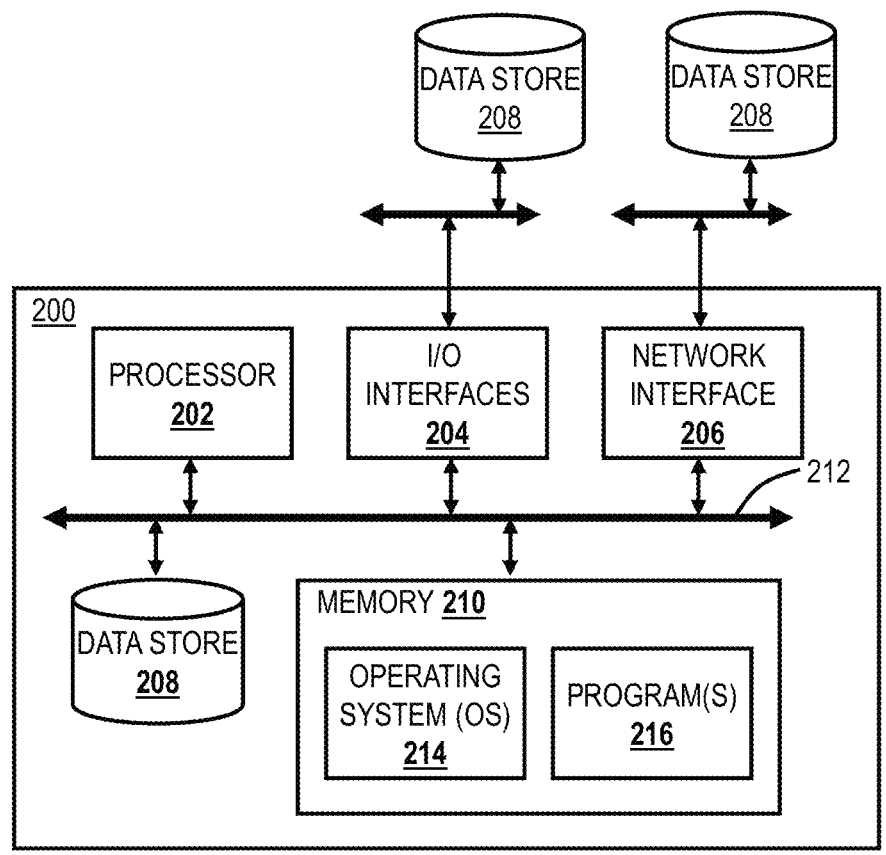
FIG. 3 is a block diagram of a processing device.

FIG. 3 is a block diagram of a processing device 200. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. The processor 202 can include at least one processor as well as multiple processors. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200 such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Cloud

The processing device 200 can be used to form a cloud system, such as a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." In an embodiment, the systems and methods described herein can be implemented as a cloud service or SaaS.

Figure 4:
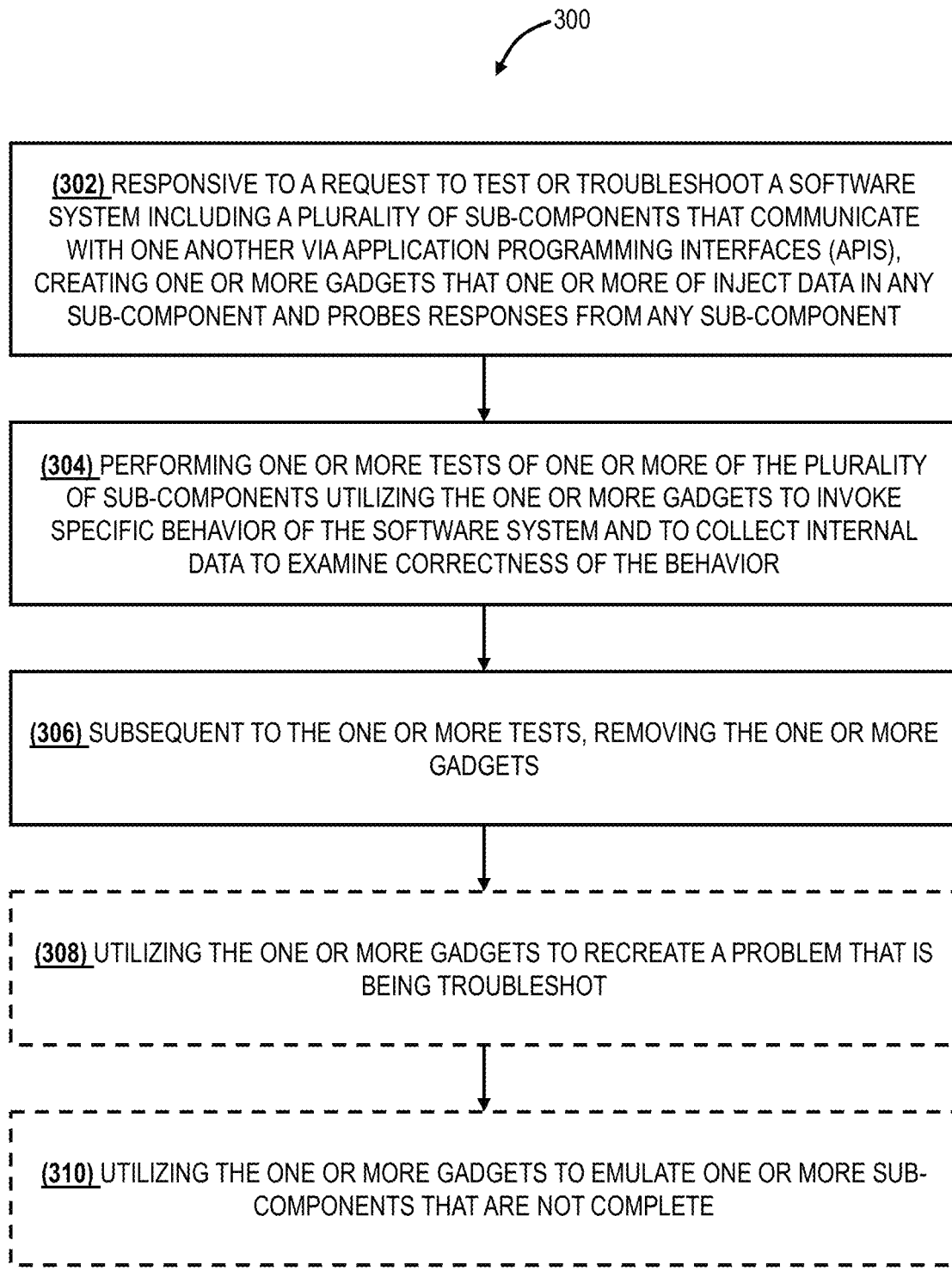
FIG. 4 is a flowchart of a process for lightweight software probe and inject gadgets for system software validation.

Process for Lightweight Software Probe and Inject Gadgets for System Software Validation FIG. 4 is a flowchart of a process 400 for lightweight software probe and inject gadgets for system software validation. The process 400 contemplates implementation as a method having steps, via a system with at least one processor configured to implement the steps, and as a non-transitory computer-readable medium having instructions configured to cause at least one processor to implement the steps.

The steps include, responsive to a request to test or troubleshoot a software system including a plurality of sub-components that communicate with one another via Application Programming Interfaces (APIs), creating one or more gadgets that one or more of inject data in any sub-component and probes responses from any sub-component (step 302); performing one or more tests of one of more of the plurality of sub-components utilizing the one or more gadgets to invoke specific behavior of the software system and to collect internal data to examine correctness of the behavior (step 304); and, subsequent to the one or more tests, removing the one or more gadgets (step 306).

The one or more gadgets are non-intrusive and do not alter behavior of the plurality of sub-components. The request can be to troubleshoot, and the steps can further include utilizing the one or more gadgets to recreate a problem that is being troubleshot (step 308). The request can be to test, and the steps can further include utilizing the one or more gadgets to emulate one or more sub-components that are not complete (step 310).

The one or more gadgets can be configured to inject the data via defined structured data and to observe behavior based on the injected data. The one or more gadgets can be contained in a container included with the software system, and wherein the one or more gadgets are interfaced locally using a Remote Procedure Call (RPC). The one or more gadgets can be contained in a container remote from the software system, and wherein the one or more gadgets are interfaced remotely using a Remote Procedure Call (RPC). The one or more gadgets can be contained in any of a container included with the software system, and a container remote from the software system.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming at least one processor to perform steps of:
   responsive to a request to test or troubleshoot a software system including a plurality of sub-components that communicate with one another via Application Programming Interfaces (APIs), wherein the software system operates in a network element and the plurality of sub-components include a microservice, creating a plurality of gadgets that one or more of inject data in any sub-component and probes responses from any sub-component, wherein the plurality of gadgets are one or more of (1) installed on-box relative to the network element such that execution is performed locally on the network element, or (2) installed off-box relative to the network element such that the execution is performed remotely against the network element;
   performing one or more tests of one or more of the plurality of sub-components utilizing the plurality of gadgets to invoke specific behavior of the software system and to collect internal data to examine correctness of the behavior; and
   subsequent to the one or more tests, removing the plurality of gadgets from the software system in the network element,
   wherein the plurality of gadgets include at least one being on-box and at least one being off-box operating in a same test scenario.

2. The non-transitory computer-readable medium of claim 1, wherein the plurality of gadgets are non-intrusive and do not alter behavior of the plurality of sub-components.

3. The non-transitory computer-readable medium of claim 1, wherein the request is to troubleshoot, and wherein the steps further include utilizing the plurality of gadgets to recreate a problem that is being troubleshot.

4. The non-transitory computer-readable medium of claim 1, wherein the request is to test, and wherein the steps further include utilizing the plurality of gadgets to emulate one or more sub-components that are not complete.

5. The non-transitory computer-readable medium of claim 1, wherein the plurality of gadgets are configured to inject the data via defined structured data and to observe behavior based on the injected data.

6. The non-transitory computer-readable medium of claim 1, wherein the plurality of gadgets that are installed on-box are contained in a container included with the software system, and wherein the plurality of gadgets are interfaced locally using a Remote Procedure Call (RPC).

7. The non-transitory computer-readable medium of claim 1, wherein the plurality of gadgets are contained in any of
   a container included with the software system, and
   a container remote from the software system.

8. A method comprising steps of:
   responsive to a request to test or troubleshoot a software system including a plurality of sub-components that communicate with one another via Application Programming Interfaces (APIs), wherein the software system operates in a network element and the plurality of sub-components include a microservice, creating a plurality of gadgets that one or more of inject data in any sub-component and probes responses from any sub-component, wherein the plurality of gadgets are one or more of (1) installed on-box relative to the network element such that execution is performed locally on the network element, or (2) installed off-box relative to the network element such that the execution is performed remotely against the network element;
   performing one or more tests of one or more of the plurality of sub-components utilizing the plurality of gadgets to invoke specific behavior of the software system and to collect internal data to examine correctness of the behavior; and
   subsequent to the one or more tests, removing the plurality of gadgets from the software system in the network element,
   wherein the plurality of gadgets include at least one being on-box and at least one being off-box operating in a same test scenario.

9. The method of claim 8, wherein the plurality of gadgets are non-intrusive and do not alter behavior of the plurality of sub-components.

10. The method of claim 8, wherein the request is to troubleshoot, and wherein the steps further include utilizing the plurality of gadgets to recreate a problem that is being troubleshot.

11. The method of claim 8, wherein the request is to test, and wherein the steps further include utilizing the plurality of gadgets to emulate one or more sub-components that are not complete.

12. The method of claim 8, wherein the plurality of gadgets are configured to inject the data via defined structured data and to observe behavior based on the injected data.

13. The method of claim 8, wherein the plurality of gadgets that are installed on-box are contained in a container included with the software system, and wherein the plurality of gadgets are interfaced locally using a Remote Procedure Call (RPC).

14. The method of claim 8, wherein the plurality of gadgets are contained in any of
   a container included with the software system, and
   a container remote from the software system.

15. A system comprising:
   at least one processor and memory comprising instructions that, when executed, cause the at least one processor to
      responsive to a request to test or troubleshoot a software system including a plurality of sub-components that communicate with one another via Application Programming Interfaces (APIs), wherein the software system operates in a network element and the plurality of sub-components include a microservice, create a plurality of gadgets that one or more of inject data in any sub-component and probes responses from any sub-component, wherein the plurality of gadgets are one or more of (1) installed on-box relative to the network element such that execution is performed locally on the network element, or (2) installed off-box relative to the network element such that the execution is performed remotely against the network element, perform one or more tests of one or more of the plurality of sub-components utilizing the plurality of gadgets to invoke specific behavior of the software system and to collect internal data to examine correctness of the behavior, and subsequent to the one or more tests, remove the plurality of gadgets from the software system in the network element, wherein the plurality of gadgets include at least one being on-box and at least one being off-box operating in a same test scenario.

16. The system of claim 15, wherein the plurality of gadgets are non-intrusive and do not alter behavior of the plurality of sub-components.

17. The system of claim 15, wherein the request is to troubleshoot, and wherein the instructions that, when executed, further cause the at least one processor to utilize the plurality of gadgets to recreate a problem that is being troubleshot.

18. The system of claim 15, wherein the request is to troubleshoot, and wherein the instructions that, when executed, further cause the at least one processor to utilize the plurality of gadgets to emulate one or more sub-components that are not complete.

* * * * *